United States Patent [19]

Cabagnero

[11] Patent Number: 4,892,327
[45] Date of Patent: Jan. 9, 1990

[54] FOLDABLE FRAMES FOR CHILDREN'S PUSHCHAIRS

[75] Inventor: Ramón J. Cabagnero, Barcelona, Spain

[73] Assignee: Jané, S.A., Barcelona, Spain

[21] Appl. No.: 177,633

[22] Filed: Apr. 5, 1988

[51] Int. Cl.⁴ .............................................. B62B 7/08
[52] U.S. Cl. ..................................... 280/650; 297/56; 280/658
[58] Field of Search ............... 280/642, 647, 649, 650, 280/658; 297/56, 58, 378

[56] References Cited

U.S. PATENT DOCUMENTS 3,421,774  1/1969  Patterson ............................ 280/642
4,126,331  11/1978  Sloan et al. ........................ 280/642
4,529,219  7/1985  Shamie ................................ 280/642

Primary Examiner—Charles A. Marmor
Assistant Examiner—Richard Camby
Attorney, Agent, or Firm—McGlew & Tuttle

[57] ABSTRACT

The invention refers to some improvements in the foldable frames for children's pushchairs, of the type which includes the handlebar fitted slidingly over the front legs, with the folding of the pushchair being obtained with the bringing down of the handlebar. With these improvements, a very complete, light children's pushchair with a simple structure and very compact folding up is obtained. These advantages are achieved by structuring the frame on the basis of a linked triangulation formed on each side by the rear (3) and front (1) legs, and by a base frame (5), the rear leg (3) being linked by its upper end (9) on a solidly jointed flange (7) of the lower end of the brace members of the handlebar (6) and along which it slides guided by the front leg (1), the front (1) and rear (3) legs being related to each other by the base frame (5) and the front legs (1) being finished off at the top with a guiding flange (8) along which the corresponding brace member of the handlebar (6) slides.

15 Claims, 3 Drawing Sheets

FOLDABLE FRAMES FOR CHILDREN'S PUSHCHAIRS

FIELD AND BACKGROUND OF THE INVENTION

This invention refers to improvements in foldable frames for children's pushchairs.

There are various types of foldable frames for children's pushchairs, with these improvements being directed at the frames which include the assembly of an inverted U handlebar fitted slidingly over the front wheel-carrying legs, and in which the folding of the pushchair is obtained by bringing down the handlebar.

SUMMARY OF THE INVENTION

The invention provides a very complete light children's pushchair with a simple structure and in which very compact folding up is obtained. The pushchair is fitted with a back and a legrest which can be arranged in various positions, with a front protection rail and a base frame which allows the arrangement of a large tray for placing various objects. Despite the completeness of this pushchair, it is easy to fold up with one single operation consisting of bringing down the handlebar, after having unlocked the corresponding safety catches which ensure the open position, which is automatically obtained by simply bringing the handlebar up, thus locking the pushchair in its open position ready for use.

These advantages are obtained by structuring the frame on the basis of a triangular linkage formed on each side by the rear and front legs and by a base frame, the rear leg being linked by its upper end on a solidly jointed flange of the lower end of the handlebar brace members and by which it slides guided by the front leg, the front and rear legs being related to each other by means of the base frame and the front legs being finished off at the top with a guiding flange along which the corresponding brace member of the handlebar slides.

The solidly jointed guiding flange of the brace member of the handlebar is joined to a brace which supports the seat frame by linkage, whose frame is in turn joined at its lower part to an intermediate point of the rear legs.

The mentioned guiding flange includes the jointed fitting of two elastically stressed securing pins and which attach to two pivots provided in the upper part of the front legs where there are stops which limit the rising of the handlebar, with manual driving levers for unlocking the mentioned securing pins having been envisaged in the solidly jointed guiding flanges of the front legs.

In this frame, instead of the mentioned jointed seat, the installing has been envisaged of a tilting seat supported by a frame fitted with means allowing it to be put in different positions in a practical way and easy to handle. Another version of the device locking the unfolded use position of the pushchair has also been envisaged, whose device has a very simplified constitution despite its semi-automatic operation.

The mentioned frame tilts through the centre of its sides and includes the reversible fitting of a seat-back-legrest unit of flexible constitution which allows this unit to face the forward direction or to face backwards, in different positions.

For this, it has been envisaged that, on the brace members of the handlebar, a support be fitted slidingly to support the seat frame, whose support is arranged between the lower guiding flange of the handlebar brace members and the complementary solidly jointed guiding flange of the upper end of the front legs.

The mentioned support is made up of a main central block sliding on the handlebar brace members, a secondary block fixed to the sides of the seat-holding frame and a control knob fitted with a securing pin, with the secondary block and the control knob being related and linked to each other by means of a shaft on which the main block is inserted, with a spring placed between the main and secondary blocks being arranged on the mentioned shaft.

The facing sides of these two blocks are provided with stopping dogs which limit the turning of one block with regard to the other, and have toothed peripheries for selecting the different positions in the mentioned rotation.

The securing pin is fitted transversally, in a sliding form and pushed by a spring, in the control knob and is located in a housing of this knob where convex protrusions of the main block fit in the support unlocking position in which the seat position can be changed.

The support locking position is ensured by the fitting of the narrow area of a keyhole-shaped hole, envisaged in the centre of the securing pin, in a central tubular rod of the main block, whose rod is provided with two opposite planes for this.

These and other characteristics shall be clearly understood in the detailed exposition which follows regarding two embodiments which are given as non-limiting examples of the scope of this invention, accompanied by some diagrams so as to facilitate understanding.

In the mentioned diagrams:

FIG. 1 illustrates in lateral elevation the assembly of the frame which is the object of these improvements, in its first version, FIG. 2 shows, also in lateral elevation, this frame in its folded position, FIG. 3 shows, in lateral elevation, the assembly of the frame of the pushchair unfolded in its use position, in its second version, FIG. 4 shows the frame according to FIG. 3 in its folded position, FIG. 5 illustrates a ground view of a detail of a support which holds the seat frame according to FIG. 3, FIG. 6 represents, on a larger scale, a longitudinal section of the support according to FIG. 5 in its locking position, FIG. 7 is a transversal section of this support made through line VII—VII of FIG. 6, FIG. 8 is a view like the previous one but with the control knob turned 90° corresponding to the unlocking position of the support, and FIG. 9 is a detail of this unlocking position in accordance with a transversal section made through line IX—IX of FIG. 8.

DESCRIPTION OF THE PREFERRED EMBODIMENTS

Figure 1:
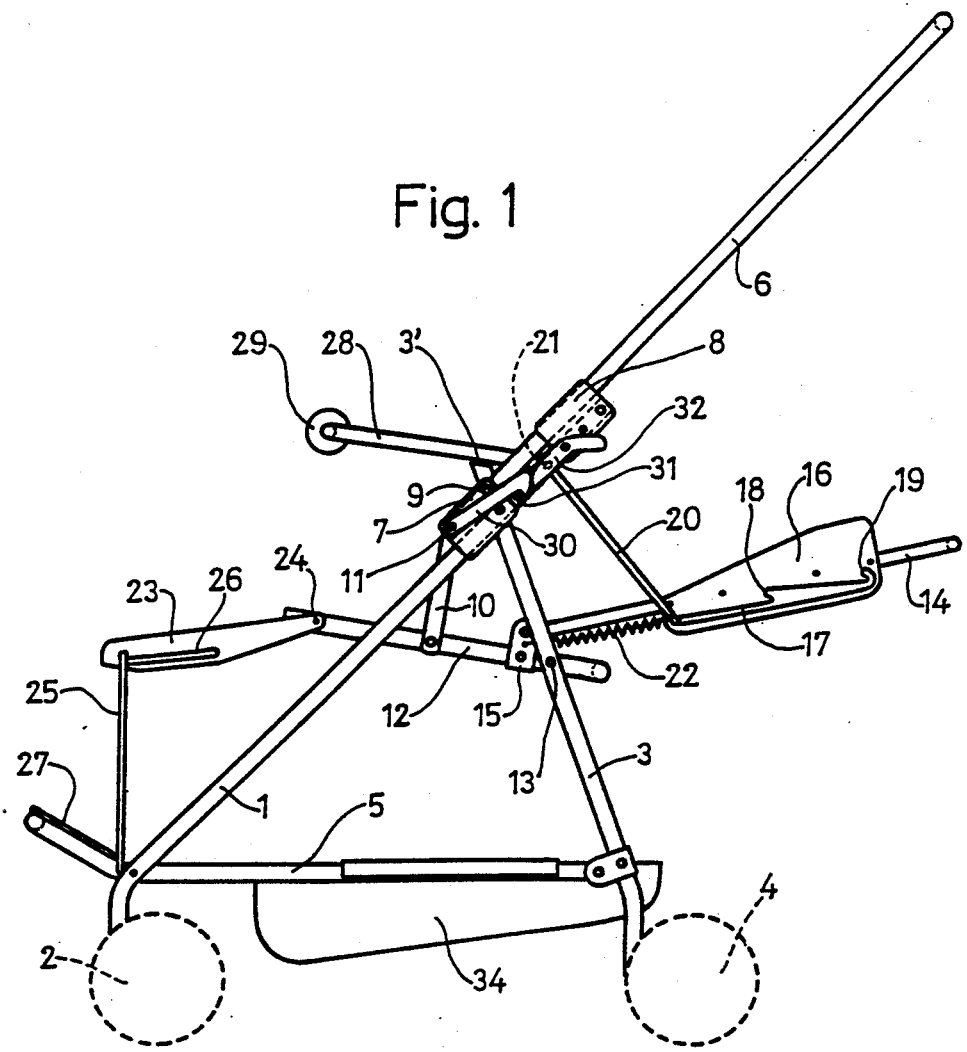

The frame which is the object of this invention is basically made up, on each side, of a slanting front leg 1 carrying the corresponding wheel 2, and a rear leg 3 on a more internal plane and which includes the corresponding wheel 4, whose legs are eye-jointed by means of a base frame 5 formed by a horizontal U element which in turn relates the legs of one side to those of the other side.

An important part of this frame is the inverted U handlebar 6 which at the lower end of its brace members has two solidly jointed flanges 7 which are guided by the respective front legs 1, whose guiding is complemented with other solidly jointed flanges of the upper end of the mentioned legs.

The rear legs link in the mentioned flanges 7 through their upper zone 9, and also, in the first version of this frame, two braces 10 through their upper end 11, which through their lower end support the seat frame 12 by linkage through the center of their sides, whose sides are linked through their rear zone to an intermediate point 13 of the rear legs 3.

Complementarily, this frame includes a back and a legrest, the first of which includes an inverted U frame 15 which at the ends of its brace members links to solidly jointed flanges 14 of the rear zone of the sides of the seat frame 12, with the side brace members of the back frame including the attachment of two ear-pieces 16 which in their rear zone are longitudinally provided with two grooves 17 with intermediate 18 and upper top 19 branch ends forming two coupling zones for the selective retention of a rod-shaped support 20 of U constitution which by the ends of its inversely bent brace members is linked at points 21 of the upper part of the front legs.

With this three back positions are obtained, one in a lying position illustrated in the diagrams and in which the rod-shaped support 20 fits in the lower end of the grooves 17 of the back ear-pieces, another in the slanting position in which the mentioned support connects at the intermediate branch end 18, and a third position with the back up in which the mentioned support fits in the far branch end 19 of the mentioned ear-pieces. These back positions are ensured by the presence of springs 22 which pull the support 20 towards the lower part of the back.

The legrest is made up of a plate 23 whose sides form two ears by which it is linked to points 24 of the front zone of the seat frame 12. The mentioned plate is supported in an elevated position as a prolongation of the seat, through an inverted U rod-shaped strut 25 and which through its intermediate section moves about in both grooves 26 of the sides of the mentioned plate so as to allow, in the displacement of the mentioned strut, the arrangement of this legrest in a hanging position so that the child can rest his feet on a plate 27 envisaged on the front part, inversely bent upwards, of the base frame 5.

The frame is completed with a front rail 28 formed by a horizontal U-shaped tubular element and which by the ends of its brace members is linked at the inversely bent ends of the brace members of the back support 20, with the central section of the mentioned rail including a fluffy cover 29, and it being established in the use position by the support of its brace members on the upper end 3' of the rear legs.

Figure 2:
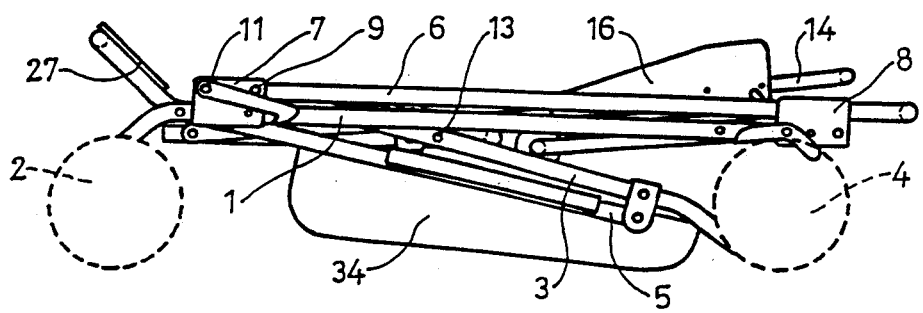
Figure 3:
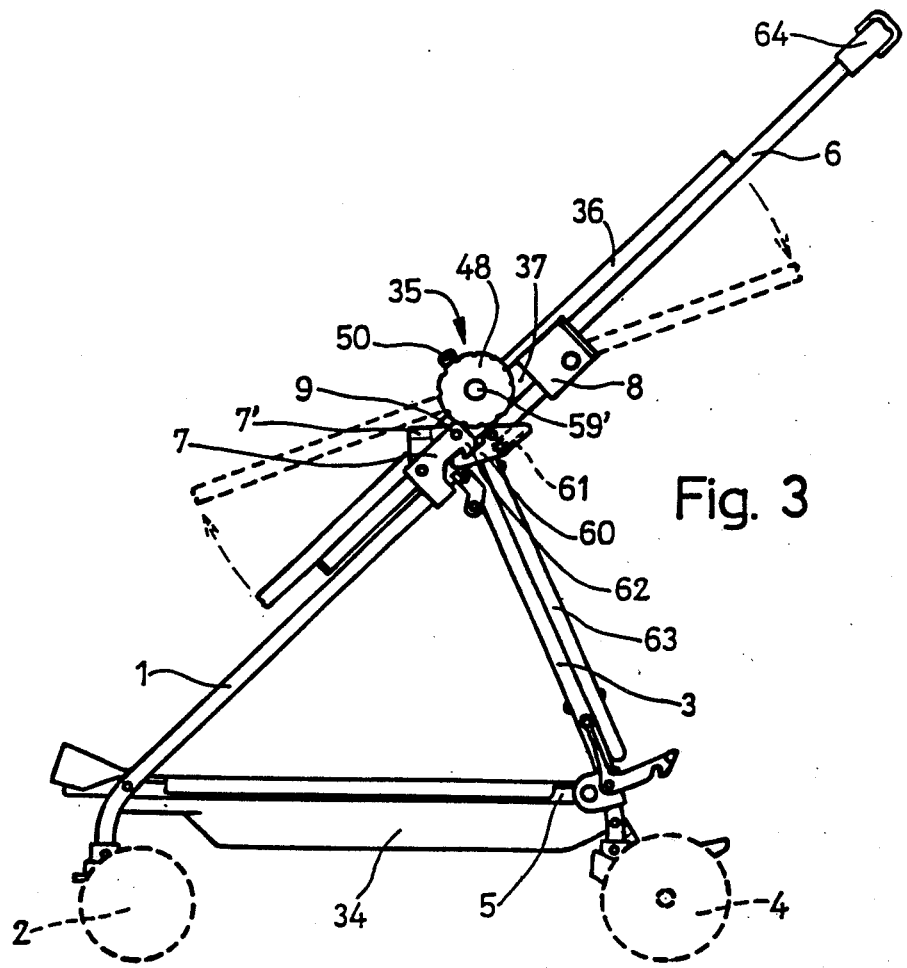
Figure 4:
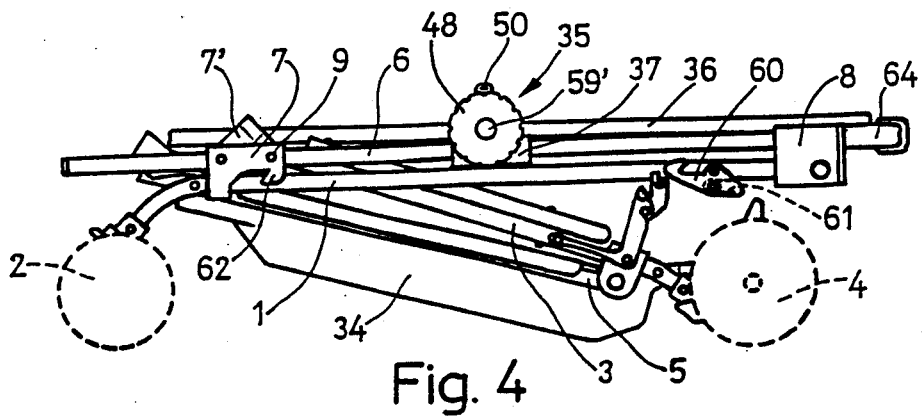
Figure 5:
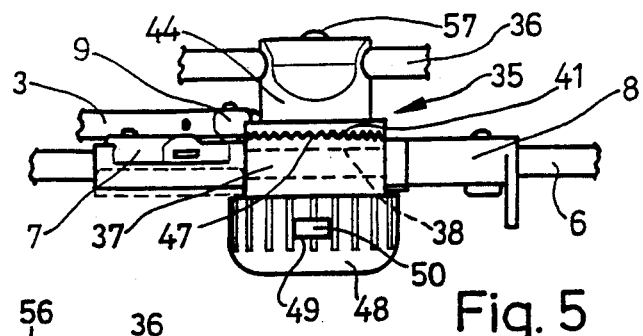

The unfolded position of the frame is ensured by means of safety catches 30 envisaged in the lower part of the brace members of the handlebar, for example on its flanges 7, which attach at two solidly jointed pivots 31 of the upper zone of the front legs 1. This coupling is unlocked by means of the corresponding linked levers 32 on the solidly jointed flanges 8 of the upper end of the mentioned legs. Both the safety catches 30 and the unlocking levers 32 are stressed elastically towards their active positions, with lever 32 having to be operated manually so as to unlock the safety catch 30 and to fold up the frame as illustrated in FIG. 2. In the unfolding of the frame, the ascent of the handlebar 6 is limited by its striking against stopping dogs made up by the actual pivots 31 in the upper zone of the front legs 1, with the safety catches 30 latching automatically on the mentioned pivots 31, and the levers 32 are supported on the safety catches.

This frame shall include various accessories such as, for example, a large tray-basket 34 which shall be advantageously coupled in a detachable manner on the base frame 5, with the pushchair being completed by the corresponding upholstery hood, safety belt, suspensions and brakes on the wheels and others.

In the second version of this frame, above the flanges 7 a support 35 is inserted to slide easily along the brace members of the handlebar 6 and which supports a frame 36 holding a flexible seat. These flanges 7 are, in their upper part, provided with a prolongation 7' by forming a boxlet for the coupling of a large hood for protection against the rain and other elements.

Figure 6:
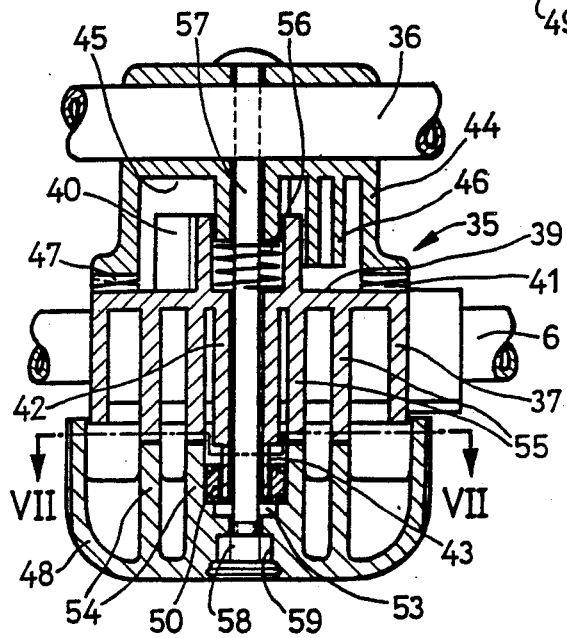

This support includes a main central block 37 fitted transversally with a passage 38 for inserting on the brace members of the handlebar, whose block forms a slight cavity 39 (FIG. 6) on the outside which is fitted with a protruding stopping dog 40, whose surface is provided with a toothed periphery 41. On its front side, the mentioned block forms a central tubular rod 42 which is provided with opposite planes 43 in its far zone.

The mentioned support 35 also includes a secondary block 44 inserted and fixed on the frame 36 of the seat, whose block is provided with a cavity 45 on its front side with a protruding stopping dog 46 and its periphery is also toothed 47.

Figure 7:
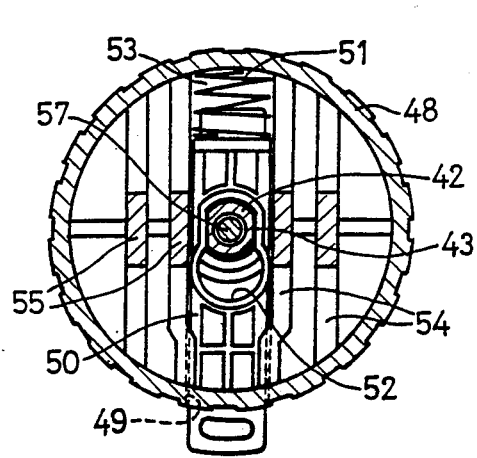

The support 35 is completed with a control knob 48 formed by an externally striated housing which is transversally provided with an opening 49 for the passage and fitting of a flat safety catch 50 which is pushed towards a protruding position by means of a spring 51 arranged between the internal end of the push-button and the actual housing (FIG. 7), whose safety catch is provided with a keyhole-shaped orifice 52 in its centre which is inserted in the far zone 43 of the tubular rod of the main block 37.

The control knob 48 is, on the inside, provided with a transversal housing 53 where the safety catch 50 is housed, and on each side of the latter includes some extensions 54 in the form of divisions against which they are supported, in the locking position of the support 35 of the seat, both protrusions in the form of flat fingers 55 with a convex end envisaged on the front side of the central block 37.

Figure 9:
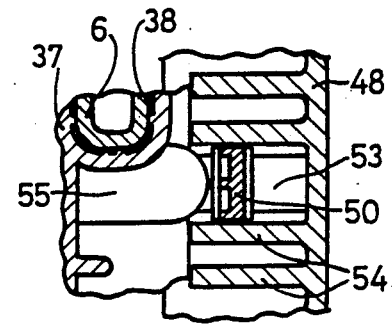
Figure 8:
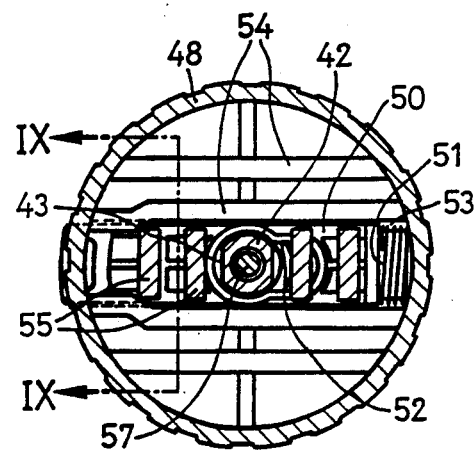

On pressing the safety catch 50 (as shown by arrow F in FIG. 7), the widest space of its orifice 52 coincides with the flattened end 43 of the rod of the central block 37, and thus the control knob can turn freely, which turns 90° in the presence of stopping dogs 40 and 46. With this rotation, the convex protrusions 55 of the block 37 fit in the housing 53 of the control knob (FIGS. 8 and 9) and thus the latter can be brought up to the mentioned block 37, to which the presence of the spring 56 envisaged between this block and the secondary block (FIG. 6) contributes. As a result, this gives the sufficient separation between these two blocks for uncoupling the annullar toothing and being able to change the position of the seat in its slant both facing forwards and backwards, on making the frame 36 turn round the shaft 57 formed by a screw which crosses the two blocks, the control knob and the mentioned frame, to whose screw a nut 58 is coupled and which is housed in a recess 59 of the control knob where there is a cover 59' concealing the nut. On the mentioned threaded shaft 57 the mentioned spring 56 is inserted.

For the locking of the unfolded use position of the pushchair, in this second version, the front legs 1 are, in their upper zone, provided with the linked fitting of a coupling lever 60 stressed towards its active position by means of a spring 61, whose lever is latched on a hook 62 formed in the actual guiding flanges 7 making up the handlebar.

With reference 63 a reinforcement is shown, made up by a U element which is subsequently juxtaposed to the rear legs 3, and with reference 64, a handle is shown fitted on the upper intermediate section of the handlebar.

The invention can, within its essential nature, be put into practice in other forms of realization which differ only in detail from those indicated solely as an example. These improvements may thus be realized in folding frames for children's pushchairs with the most suitable means and materials, with the component elements being able to be substituted by other technically equivalent elements.

I claim:

1. A carriage comprising a base frame having a front end and an opposite base frame rear end, a front leg having a lower front leg end pivotally connected to said base frame adjacent said base frame front end, said front leg having an opposite front leg end extending obliquely upwardly in an unfolded position, a rear leg having a rear leg end pivotally connected to said base frame adjacent said base frame rear end and an opposite rear leg outer end, a front leg guiding sleeve pivotally connected to said rear leg adjacent said outer end and being slidable on said front leg, a handle bar having an inner end fixed on said front leg guiding sleeve, a handle bar guiding sleeve slidable on said handle bar and fixed to said opposite front leg end, detent means permitting movement of said front leg guiding sleeve in a direction toward said front leg but locking said front leg guiding sleeve in an adjusted position, and releasable latching means defined between said handle bar and said front leg preventing movement of said handle bar and said rear leg to said front leg.

2. A carriage according to claim 1, further comprising at least one seat support construction, each seat support construction having a main block connected to said carriage frame and having an opening therethrough, said main block having an interior end, a plurality of teeth arranged on said interior end, a secondary block adjacent said main block having an exterior end, a plurality of a corresponding teeth arranged on said secondary block exterior end and engageable with said teeth on said main block interior end for preventing any relative rotational movement therebetween, a seat frame arranged on said secondary block, a shaft having an axis and having a first end connected rotatably to said secondary block and having a second end, said shaft protruding through said opening in said main block, a control knob adjacent said main block and connected to said second end of said shaft, a plurality of transverse fingers each having an outer surface arranged on said main block exterior end and extending toward said control knob, a plurality of transverse extensions, each having an inner surface arranged on said control knob and extending toward said main block, said inner surface of said transverse extensions positionable to be in contact with said outer surface of said transverse fingers, said control knob having a recess arranged substantially perpendicular to said extensions, said control knob being rotatably adjustable to position said recess over said main block fingers, said control knob being pulled by a biasing means toward said main block upon the positioning of said recess over said fingers in an inward direction relative and toward said main block, said secondary block being pushed in said inward direction by said biasing means with said control knob via said shaft, the movement of said secondary block relative to said main block separating said annular teeth on said secondary block from said annular teeth on said main block allowing a free rotation of said secondary block about said axis of said shaft, said free rotation allowing any positional adjustment of said seat frame, upon said any positional adjustment, said transverse extensions being rotatably repositionable over said transverse fingers moving said control knob in an outward direction relative to said main block and moving said secondary block toward said main block engaging said secondary block teeth with said main block teeth preventing any movement of said secondary block relative to said main block.

3. A carriage according to claim 2, wherein said control knob has a releasable safety catch for ensuring the positioning of said inner surface of said transverse extensions over said outer surface of said transverse fingers.

4. A carriage according to claim 2, wherein said control knob has a transverse recess with an opening at the periphery of said control knob, said safety catch being fitted in said transverse recess with a first end protruding outwardly from said control knob through said opening, and a second end extending inwardly into said control knob, said safety catch having a keyhole shaped orifice arranged between said first end and said second end having a locking position and an unlocking position.

5. A carriage according to claim 4, wherein said main block has a protruding locking surface, said keyhole-shaped orifice includes a first portion rotatably fittable over said protruding locking surface in said locking position, and said orifice includes a second portion lockingly fittable over said protruding locking surface in said locking position.

6. A carriage according to claim 1, further comprising a brace having a first end pivotally attached to said front leg guiding flange and extending substantially downward toward a second end, a seat portion having a front end and a rear end, said brace second end being pivotally connected to said seat portion between said front end and said rear end, said seat portion rear end being pivotally connected to said rear leg.

7. A carriage according to claim 6, further comprising a back portion being pivotally connected to said seat portion.

8. A carriage according to claim 7, wherein said back portion includes two opposite ears, each defining a coupling groove, each of said coupling grooves having a slide portion and a locking portion; a support with a first end pivotally connected adjacent said front leg opposite end, said support having a second end slidably disposed in said coupling groove slide portion and being lockingly positionable in said locking portion to effect adjustable angular positioning of said back portion.

9. A carriage according to claim 6, further comprising a leg rest defining a groove, said leg rest having an end being pivotally connected to said seat portion;
a strut being pivotally connected at a first end to said front leg lower front leg end and said strut having a second end being slidably disposed in said leg rest groove.

10. A carriage according to claim 1, further comprising:
a main block connected to said carriage frame and having an exterior face;
a secondary block being axially translatable and rotatable relative to said main block;
a control knob adjacent said exterior face of said main block and being rotatable relative to said main block, a seat frame attached to said secondary block;
arresting means for preventing rotation of said secondary block and said seat frame relative to said main block;
said arresting means being effected by said secondary block being held against said main block;
said main block defining a hole therethrough;
a shaft having a first end connected to said secondary block, said shaft extending through said main block hole and fixed to said control knob at a second end;
said control knob having an interior surface with a protruding portion and a recessed portion;
said main block having a protruding portion, said control knob being positionable to place said control knob protruding portion over said main block protruding portion thereby pulling said secondary block toward said main block and effecting said arresting means, and said control knob being positionable to place said main block protruding portion into said control knob recess disengaging said arresting means.

11. A carriage according to claim 10, wherein said control knob includes locking means for locking said control knob in a first position for effecting said arresting means.

12. A carriage according to claim 11, wherein said locking means includes a safety catch, said control knob defining a hollow transverse housing with a peripheral opening on said control knob, said safety catch being slidably fitted in said transverse housing and protruding out through said opening, said safety catch defining a keyhole-shaped orifice with an unlocking portion and a locking portion, said main block including a tubular rod with a lockable extension extending through said keyhole-shape orifice, said safety catch being positionable to place said locking portion over said lockable extension thereby locking said control knob in a nonrotatable position, and said safety catch being positionable to place said unlocking portion over said lockable extension.

13. A carriage according to claim 1, wherein said front leg opposite end has a latch pivotally mounted thereon having a first position, said front leg guiding flange having a hook-shaped prolongation, said latch being coupled to said prolongation when the carriage is in an upright position and said latch is in said first position, and said latch being uncoupled from said prolongation when said latch is in a second position.

14. A carriage according to claim 13, wherein said latch is elastically biased toward said first position.

15. A carriage according to claim 1, wherein said front leg guiding flange has a pivotal safety catch mounted thereon, said front leg having a protruding member, said safety catch having a hook-shaped latching portion for latching onto said protruding member thereby holding said carriage in an upright position.

* * * * *